(12) United States Patent
Ashikawa

(10) Patent No.: US 7,832,683 B2
(45) Date of Patent: Nov. 16, 2010

(54) REEL AND MANUFACTURING METHOD THEREOF

(75) Inventor: Teruo Ashikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 11/763,724

(22) Filed: Jun. 15, 2007

(65) Prior Publication Data

US 2007/0290095 A1     Dec. 20, 2007

(30) Foreign Application Priority Data

Jun. 16, 2006   (JP)   ................ 2006-167743

(51) Int. Cl.
   *G11B 15/32*   (2006.01)
(52) U.S. Cl. ................ 242/609.4; 242/348; 242/608.8; 242/613; 242/613.4
(58) Field of Classification Search ............ 242/608.8, 242/609.4, 608, 609, 609.1, 610, 610.6, 613, 242/613.4, 348, 348.2; 360/132
   See application file for complete search history.

(56) References Cited

U.S. PATENT DOCUMENTS 4,083,509 A * 4/1978 Vasudeva et al. ......... 242/608.8
4,088,278 A * 5/1978 Adair .................... 242/608.8
4,296,890 A * 10/1981 Posso .................... 242/608.8
5,564,647 A * 10/1996 Bay et al. ............... 242/608.8
6,349,015 B1 * 2/2002 Hayashi ................... 360/132

FOREIGN PATENT DOCUMENTS

| JP | 05254735 A | * | 10/1993 |
| JP | 8069677 A | | 3/1996 |
| JP | 2002-133818 A | | 5/2002 |
| JP | 2005-108409 A | | 4/2005 |

OTHER PUBLICATIONS

Japanese Office Action With English Translation, Apr. 27, 2010.

* cited by examiner

*Primary Examiner*—William A Rivera
(74) *Attorney, Agent, or Firm*—Sughrue Mion, PLLC

(57) ABSTRACT

A reel includes: a circular cylinder-shaped hub that includes an inner peripheral surface on which a protruding portion that protrudes in a radial direction is formed and an outer peripheral surface around which recording tape is wound; a first flange that is disposed on one end portion of the hub and includes a first extension portion that is welded to the protruding portion; and a second flange that is disposed on the other end portion of the hub and includes a second extension portion that is welded to the protruding portion. The rigidity of the hub can be improved, and the welding strength of the flanges with respect to the hub can also be improved.

12 Claims, 8 Drawing Sheets

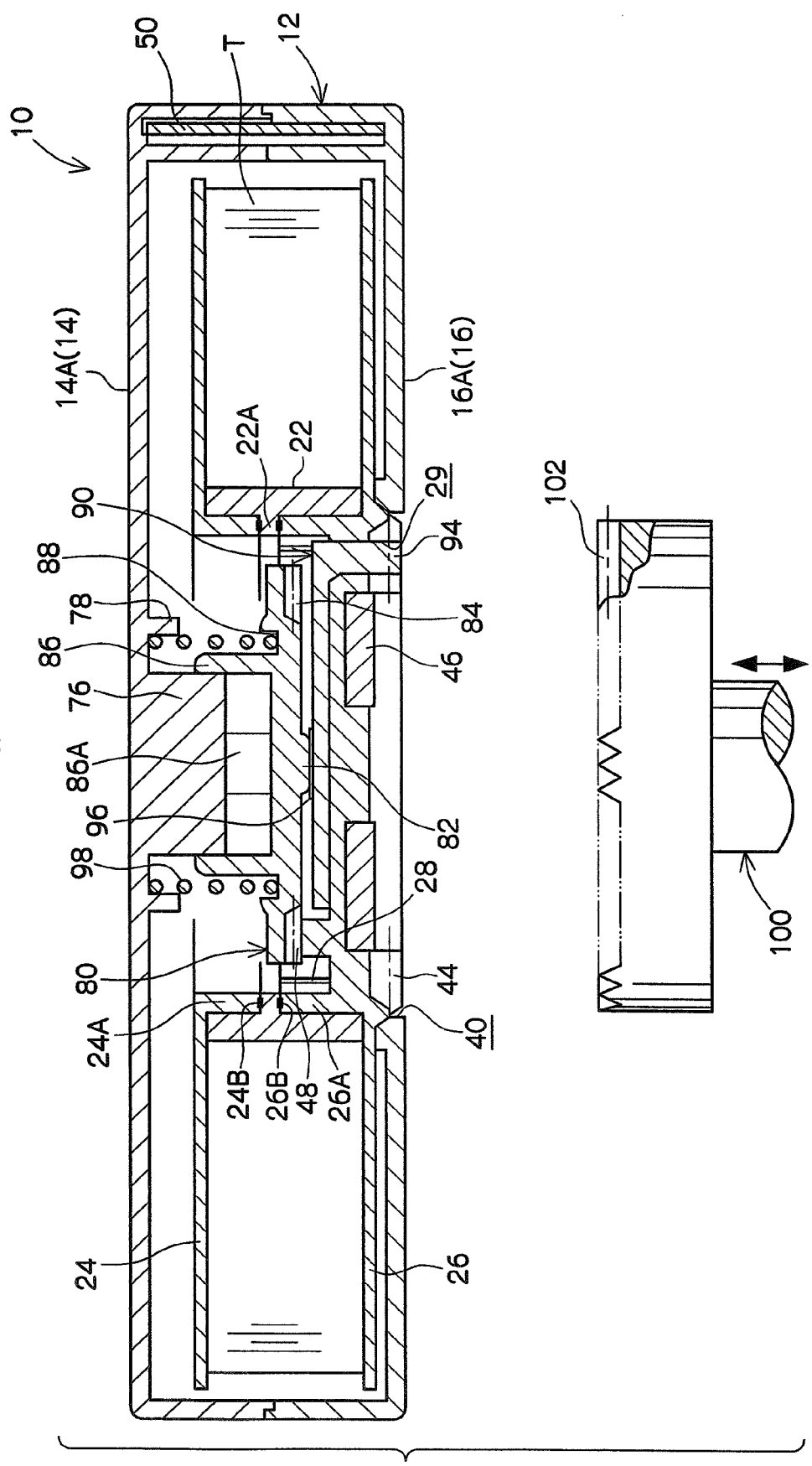

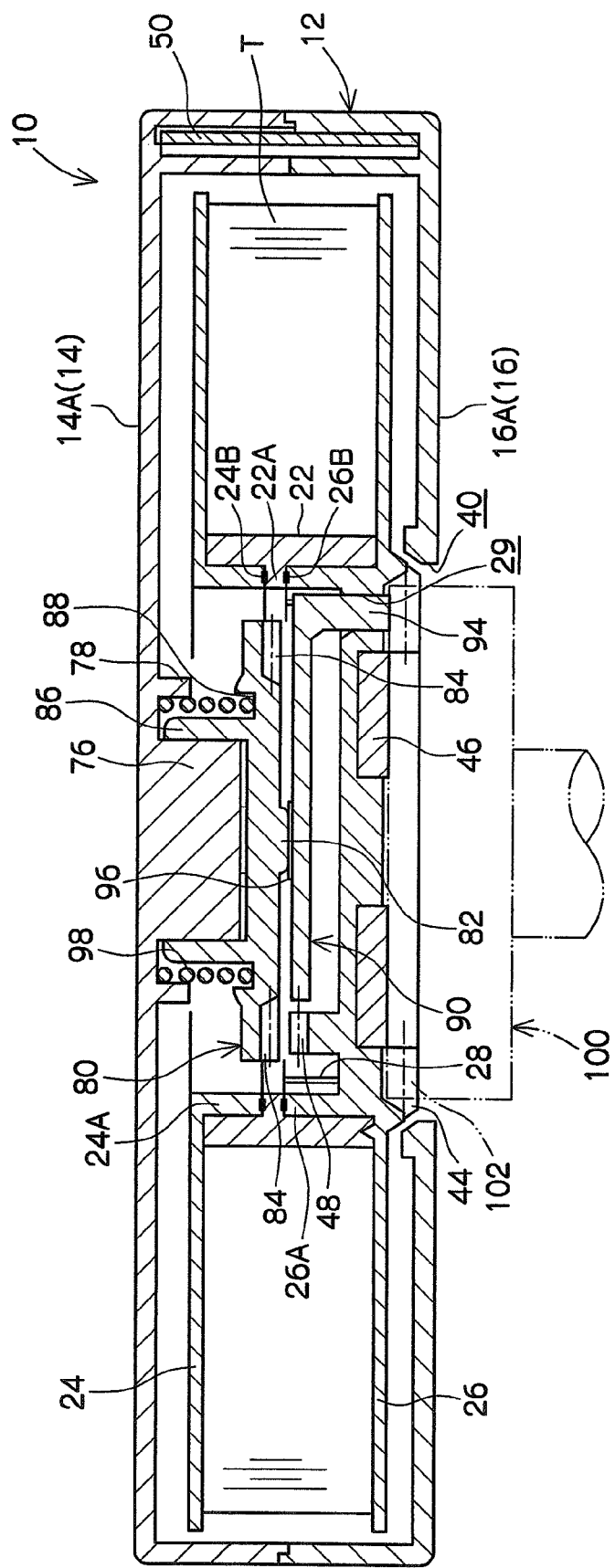

REEL AND MANUFACTURING METHOD THEREOF

CROSS-REFERENCE TO RELATED APPLICATION

This application claims priority under 35 USC 119 from Japanese Patent Application No. 2006-167743, the disclosure of which is incorporated by reference herein.

BACKGROUND OF THE INVENTION

1. Field of the Invention

The present invention relates to a reel around which is wound recording tape such as magnetic tape used for saving data of computers and the like and to a manufacturing method thereof.

2. Description of the Related Art

Conventionally, recording tape cartridges have been known where recording tape such as magnetic tape used as a data recording and playback medium (data backup) for computers and the like is wound onto a reel made of resin and the reel is singly housed inside a case. In the reel of the recording tape cartridge, sometimes a hub around which the recording tape is wound and an upper flange and a lower flange that hold the width direction end portions of the recording tape are formed separately (e.g., see JP-A No. 2002-133818 and JP-A No. 2005-108409).

In a reel of such a three-piece (part) structure, the upper flange is welded to the upper end portion of the hub, and the lower flange is welded to the lower end portion of the hub. Consequently, when the hub becomes deformed by the winding constriction of the recording tape, there is the potential for the upper flange and the lower flange welded to the hub to become deformed by the affects of that deformation. Further, when the upper flange and the lower flange are respectively welded to the upper end portion and the lower end potion of the hub, there is also the problem that the welding strength is not sufficiently ensured, such as there being the potential for the upper flange and the lower flange to separate from the hub during deformation.

SUMMARY OF THE INVENTION

Thus, in view of these problems, it is an object of the present invention to obtain a reel of a three-piece structure that can improve the rigidity of the hub and can also improve the welding strength of the flanges with respect to the hub.

In order to achieve this object, a first aspect of the invention provides a reel including: a cylinder-shaped hub having a substantially circular cross-section that includes an inner peripheral surface on which a protruding portion that protrudes in a radial direction is formed and an outer peripheral surface around which recording tape is wound; a first flange that is disposed on one end portion of the hub and includes a first extension portion that is welded to the protruding portion; and a second flange that is disposed on the other end portion of the hub and includes a second extension portion that is welded to the protruding portion.

According to the reel of the first aspect of the invention, the first extension portion of the first flange and the second extension portion of the second flange are welded to the protruding portion formed on the inner peripheral surface of the hub, so that the welding strength of the first flange and the second flange with respect to the hub can be improved, and the rigidity of the hub can be improved.

In the reel of the first aspect of the invention, the protruding portion may be annularly formed.

According to this configuration, because the protruding portion is annularly formed, the welding strength of the first flange and the second flange with respect to the hub can be improved even more, and the rigidity of the hub can be improved even more.

In the reel of the first aspect of the invention, the protruding portion may be formed in the substantial center of the hub in an axial direction of the hub.

According to this configuration, because the protruding portion is formed in the substantial center of the hub, the welding strength of the first flange and the second flange with respect to the hub can be improved even more, and the rigidity of the hub can be improved even more.

In the reel of the first aspect of the invention, the protruding length of the protruding portion may be equal to the thickness of the first extension portion and the second extension portion.

According to this configuration, because the protruding length of the protruding portion is equal to the thickness of the first extension portion and the second extension portion, there is no potential for a brake member and a release member disposed inside the hub to interfere with the protruding portion.

As described above, according to the present invention, a reel of a three-piece structure that can improve the rigidity of the hub and can also improve the welding strength of the flanges with respect to the hub can be provided.

BRIEF DESCRIPTION OF THE DRAWINGS

FIG. 7 is a schematic side sectional view showing the recording tape cartridge before it meshes with a drive gear of a rotating shaft; and FIG. 8 is a schematic side sectional view showing the recording tape cartridge after it meshes with the drive gear of the rotating shaft.

DETAILED DESCRIPTION OF THE INVENTION

Figure 1:
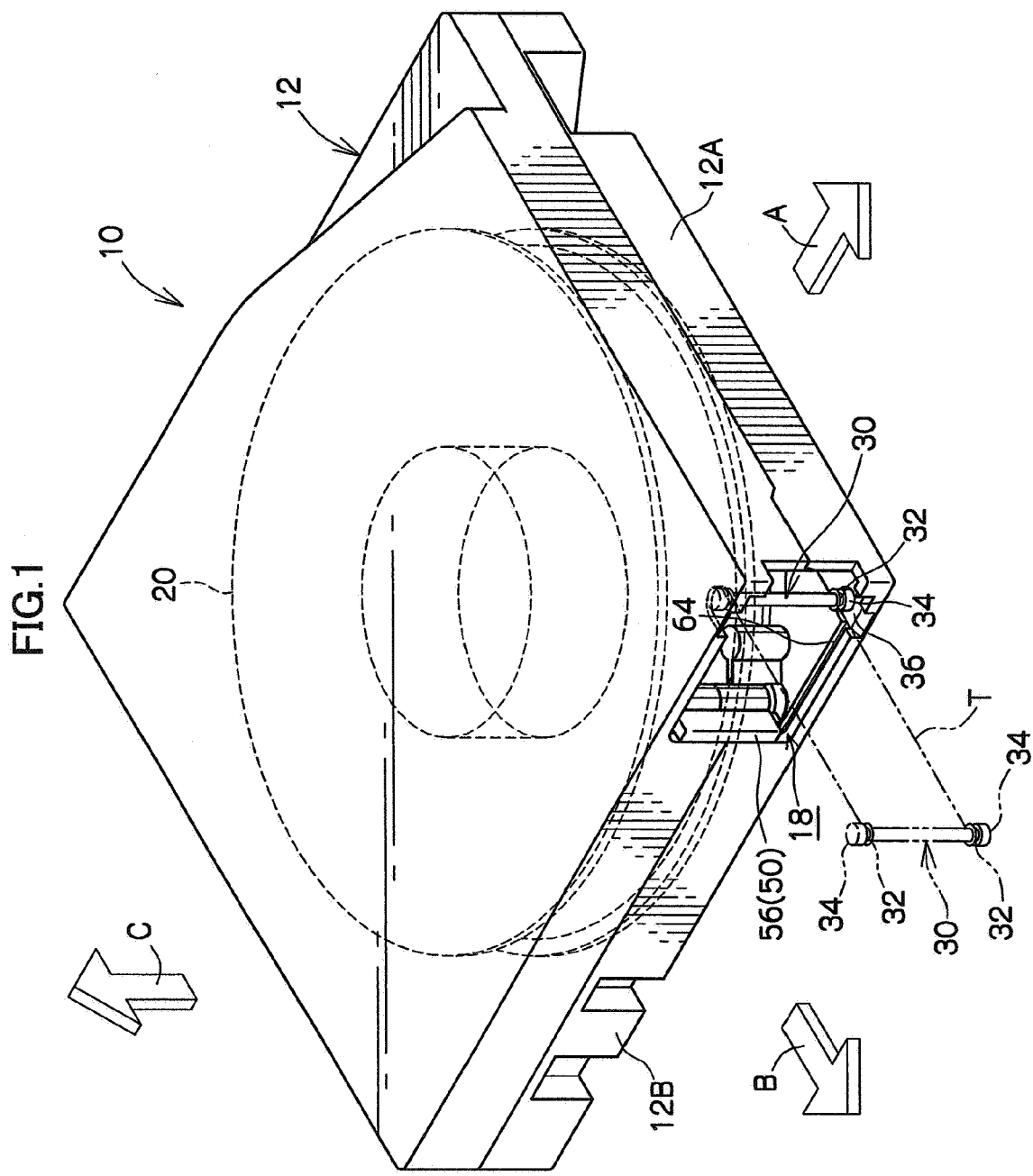
FIG. 1 is a schematic perspective view of a recording tape cartridge.

The best mode for implementing the present invention will be described in detail below on the basis of an exemplary embodiment shown in the drawings. First, the schematic configuration of a recording tape cartridge 10 will be described, and then a reel 20 will be described. For the convenience of description, arrow A will represent the direction in which the recording tape cartridge 10 is loaded into a drive device and be referred to as a front direction (front side) of the recording tape cartridge 10. Arrow B will represent a direction orthogonal to the direction of arrow A and be referred to as a right direction (right side), and arrow C will represent a direction orthogonal to the directions of arrow A and arrow B and be referred to as an upper direction (upper side). When the phrase "radial direction" is used below, this will indicate a direction parallel to a direction facing radially outward from an axial center (center) line of the reel 20 housed in a case 12.

Figure 2:
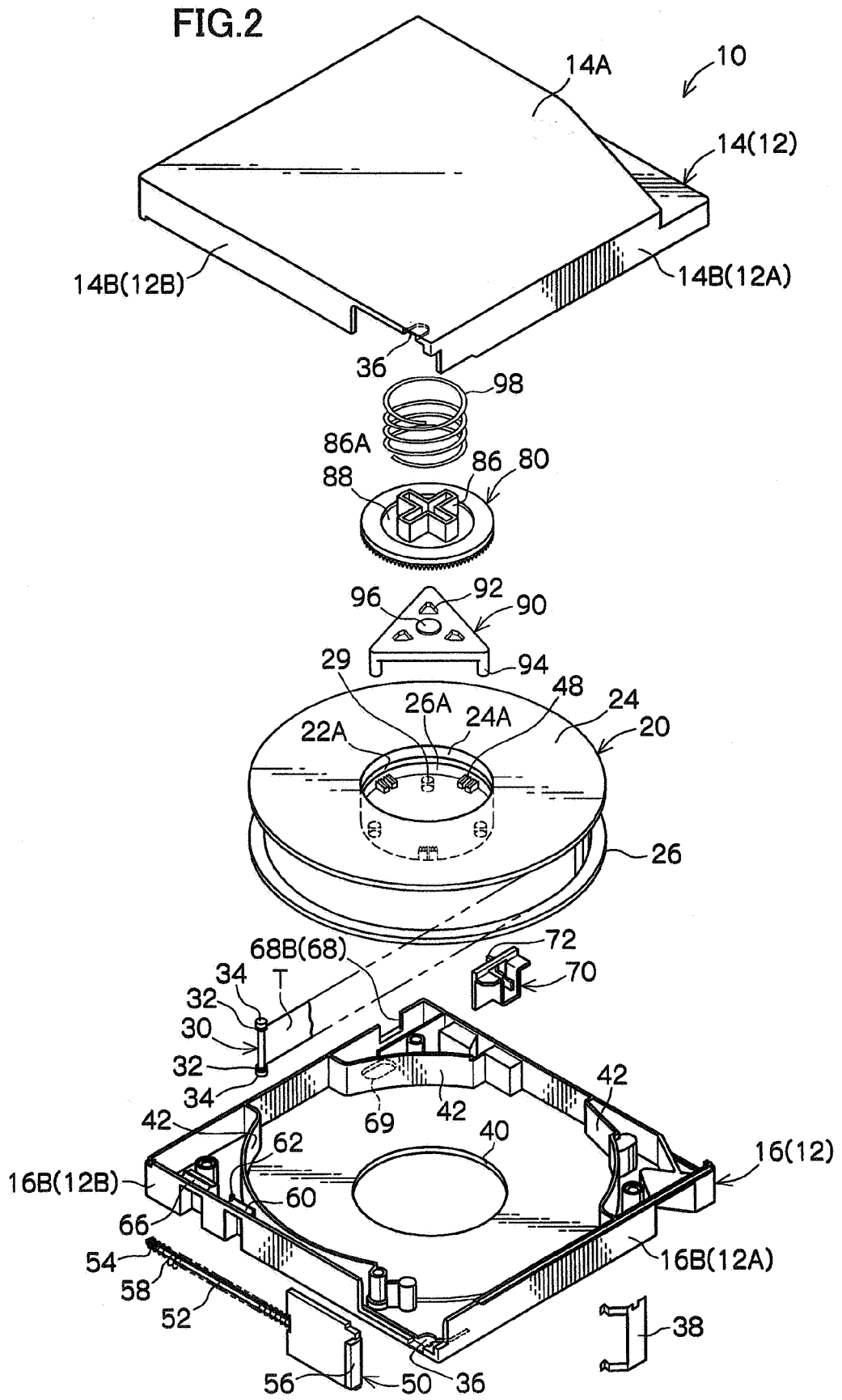
FIG. 2 is a schematic exploded perspective view of the recording tape cartridge as seen from above.
Figure 3:
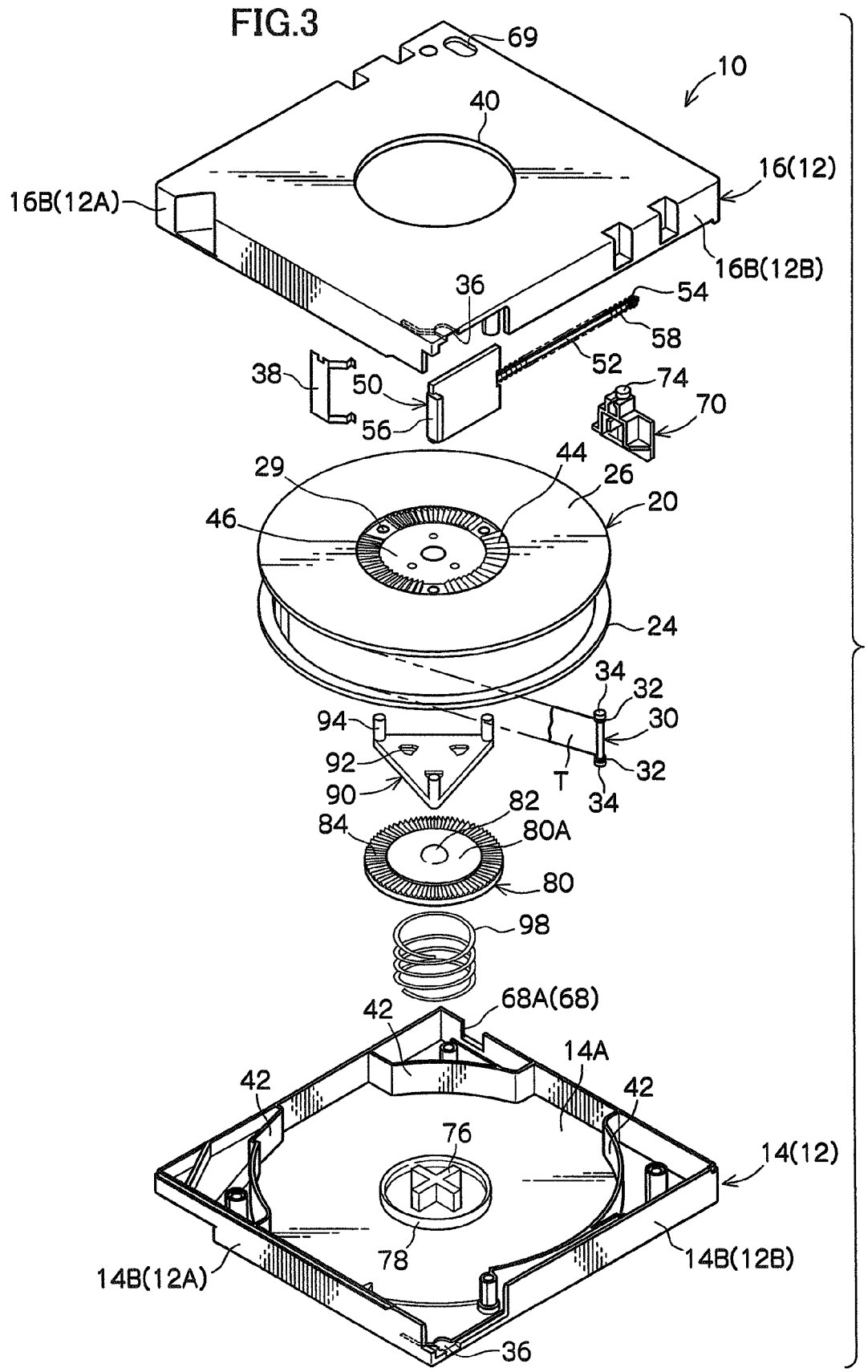
FIG. 3 is a schematic exploded perspective view of the recording tape cartridge as seen from below.

As shown in FIG. 1 to FIG. 3, the recording tape cartridge 10 includes a case 12 that has a substantially rectangular box-like shape. The case 12 includes an upper case 14 and a lower case 16 made of a resin such as polycarbonate (PC). The upper case 14 is configured by a top plate 14A and peripheral wall 14B that is disposed upright along the peripheral edge of the top plate 14A. The lower case 16 is configured by a bottom plate 16A and a peripheral wall 16B that is disposed upright along the peripheral edge of the bottom plate 16A. The case 12 is configured as a result of the upper case 14 and the lower case 16 being joined together by ultrasonic welding or with screws in a state where the peripheral wall 14B and the peripheral wall 16B have been brought into contact with each other.

An opening 18 for allowing the recording tape T wound onto the later-described reel 20 to be pulled out is formed in a right wall 12B of the case 12. A leader pin 30 that locks to (engages with) and is pulled out by a pullout member (not shown) of the drive device is fixedly attached to the free end portion of the recording tape T pulled out from the opening 18. Annular grooves 32 are formed in both end portions of the leader pin 30 that project from the width direction end portions of the recording tape T, and the annular grooves 32 lock with hooks or the like of the pullout member. Thus, the hooks or the like do not contact and damage the recording tape T when they pull out the recording tape T.

A pair of upper and lower pin holding portions 36 that position and hold the leader pin 30 inside the case 12 is disposed inside the opening 18 in the case 12—that is, in the inner surface of the top plate 14A of the upper case 14 and in the inner surface of the bottom plate 16A of the lower case 16. The pin holding portions 36 have a substantially semicircular shape whose side where the recording tape T is pulled out is open, so that both end portions 34 of the leader pin 30 in an upright state can enter and exit the insides of the pin holding portions 36 from the open sides thereof.

A plate spring 38 is fixedly disposed in the vicinity of the pin holding portions 36. The two-pronged distal end portions of the plate spring 38 respectively engage with both the upper and lower end portions 34 of the leader pin 30 and hold the leader pin 30 in the pin holding portions 36. It will be noted that when the leader pin 30 enters and exits the pin holding portions 36, the distal end portions of the plate spring 38 appropriately elastically deform to allow movement of the leader pin 30.

The opening 18 is opened and closed by a door 50. The door 50 is formed in a substantially rectangular plate-like shape of a size capable of closing the opening 18, and groove portions 64 that allow the upper and lower end portions of the door 50 to slidably fit therein are formed in the top plate 14A and the bottom plate 16A inside the opening 18 so that the door 50 can move along the right wall 12B of the case 12.

A shaft 52 is disposed on, so as to project from, the center of the rear end portion of the door 50, and a coil spring 58 is fitted over the shaft 52. An expanded portion 54 that prevents the coil spring 58 from coming off is formed on the rear end of the shaft 52. Further, a support mount 60 including a locking portion 62 that locks the rear end of the coil spring 58 fitted over the shaft 52 is disposed on, so as to project from, the lower case 16.

Consequently, the shaft 52 is slidably supported on the support mount 60 and the rear end of the coil spring 58 is locked to the locking portion 62, whereby the door 50 is always biased by the biasing force of the coil spring 58 in the direction in which it closes the opening 18. It will be noted that it is preferable to further dispose, on the rear side of the support mount 60, a support mount 66 that supports the shaft 52 when the opening 18 is open.

Further, a convex portion 56 for opening and closing the door 50 is disposed on the front end portion of the door 50 so as to project outward. The convex portion 56 engages with an opening/closing member (not shown) of the drive device in accompaniment with the loading of the recording tape cartridge 10 into the drive device. Thus, the door 50 is opened counter to the biasing force of the coil spring 58.

Further, a write-protect member 70 that is set to allow or not allow recording to the recording tape T is disposed on the left rear portion of the case 12 so as to be slidable in the left/right direction, and an open hole 68 that allows an operation projection 72 for manually operating the write-protect member 70 to project therefrom is formed in the rear wall of the case 12. The open hole 68 is formed by a notched portion 68A formed in the peripheral wall 14B of the upper case 14 and by a notched portion 68B formed in the peripheral wall 16B of the lower case 16 when the upper case 14 and the lower case 16 are joined together.

Moreover, an elongate hole 69 from which a projecting portion 74 of the write-protect member 70 is exposed is disposed in the lower case 16 so as to be long in the left/right direction. When the recording tape cartridge 10 has been loaded into the drive device, the drive device detects the position of the write-protect member 70 to automatically determine whether or not recording to the recording tape T is allowed. It will be noted that the projecting portion 74 does not project from the undersurface of the lower case 16.

Figure 4:
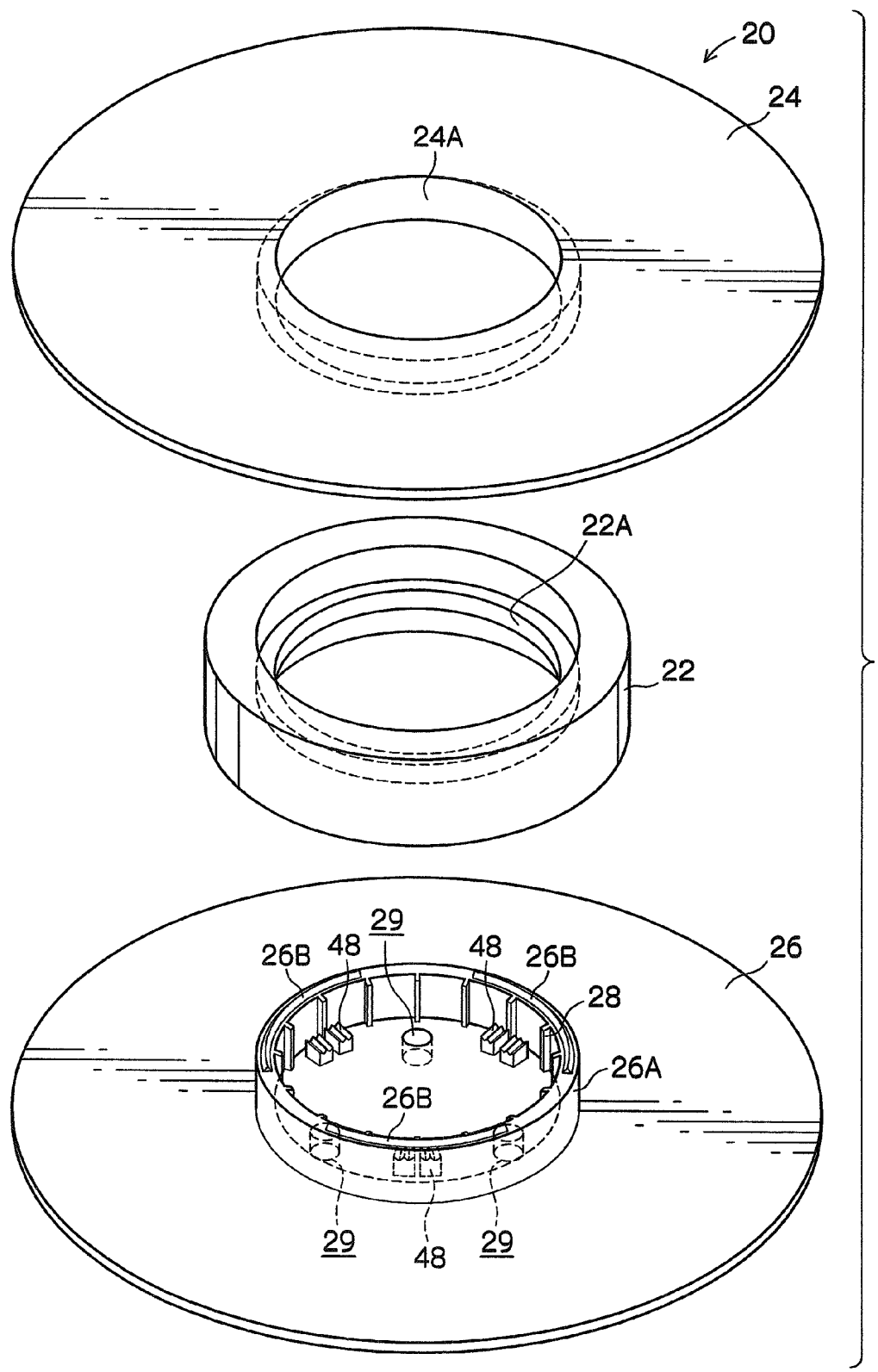
FIG. 4 is a schematic exploded perspective view showing the configuration of a reel.
Figure 5:
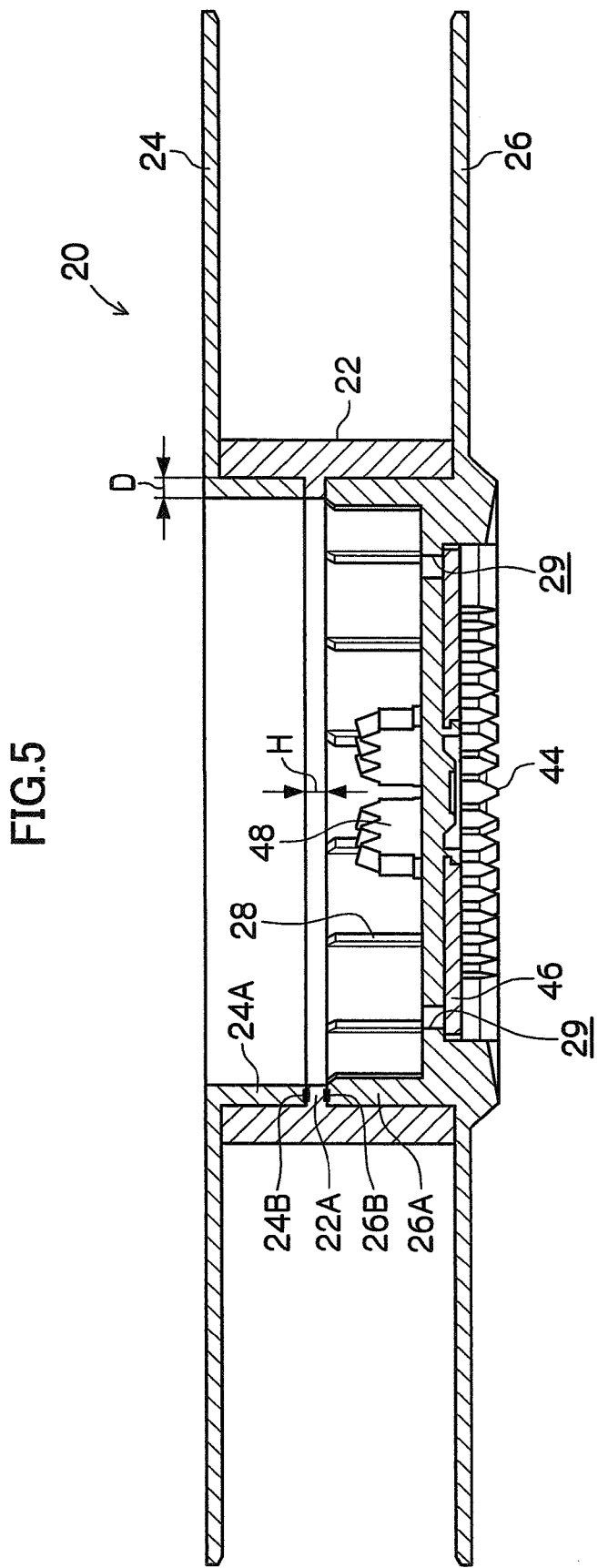
FIG. 5 is a schematic side sectional view showing the configuration of the reel.
Figure 6:
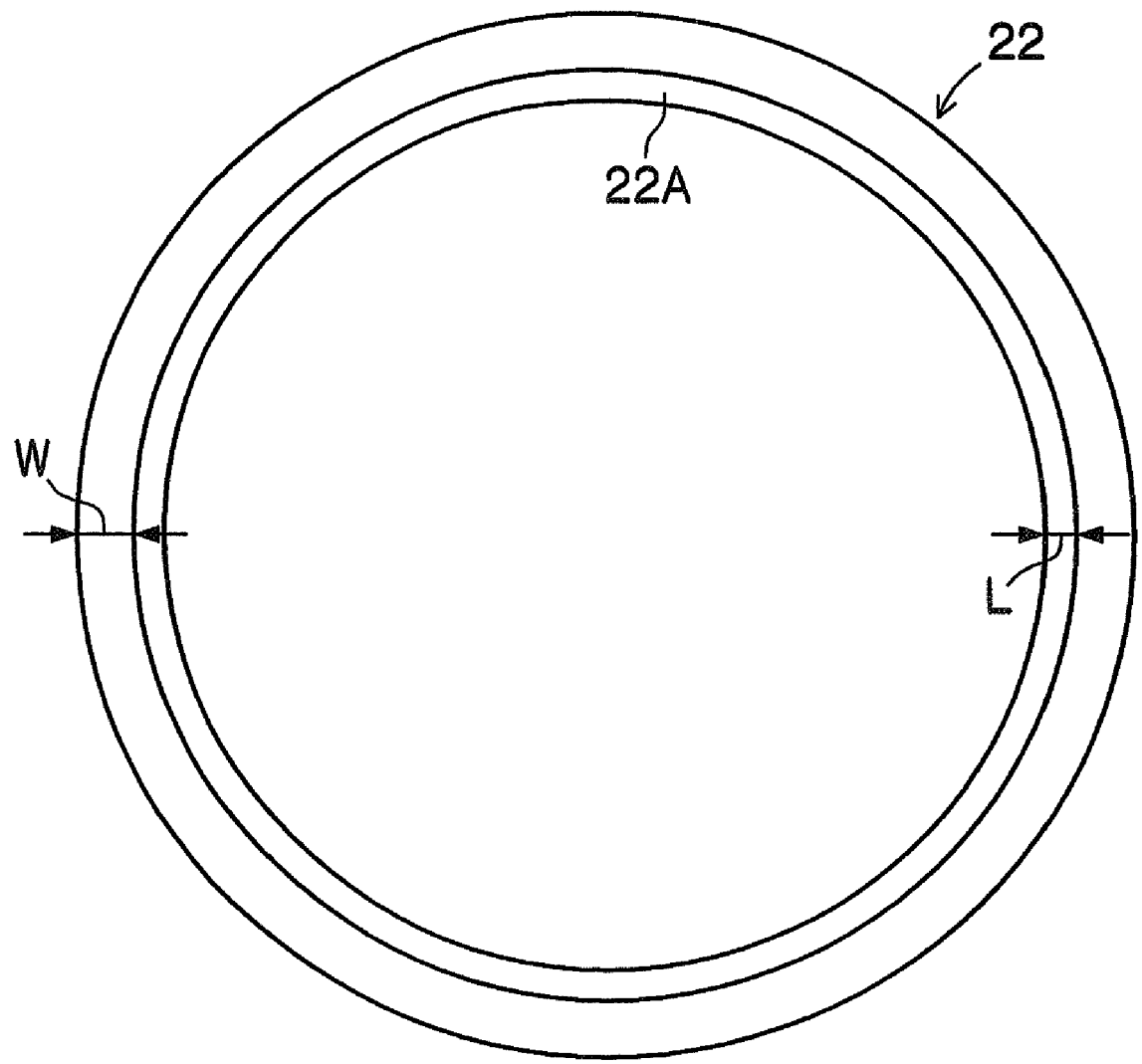
FIG. 6 is a schematic plan view of a reel hub.

Next, the reel 20 and a brake member 80 that deters rotation of the reel 20 when the reel 20 is not in use (when the recording tape cartridge 10 is not loaded in the drive device) will be described. Just one reel 20 made of a resin such as polycarbonate (PC) is rotatably housed inside the case 12. As shown in FIG. 4 to FIG. 6, the reel 20 is configured by a circular cylinder-shaped hub 22 that configures the axial center portion of the reel 20, an annular upper flange 24 disposed on the upper end portion of the hub 22, and a discoid lower flange 26 disposed on the lower end portion of the hub 22. Recording tape T such as magnetic tape serving as an information recording and playback medium is wound around the outer peripheral surface of the hub 22, and the width direction end portions of the wound recording tape T are held by the upper flange 24 and the lower flange 26.

A protruding portion 22A that has a rectangular shape when seen in cross-sectional view and protrudes a predetermined length L in the radial direction toward the rotational center of the reel 20 (the reel hub 22) is annularly (in the circumferential direction) disposed on, so as to project from, the inner peripheral surface of the reel hub 22 in the substantial center of the reel hub 22 in its height direction. Further, an annular extension portion 24A is disposed upright on, so as to extend a predetermined height from, the inner peripheral edge portion of the upper flange 24, and an annular extension portion 26A is disposed upright on, so as to extend a predetermined height from, the upper surface of the lower flange 26 and at a predetermined position capable of coaxially facing the annular extension portion 24A. Plural (e.g., three) welding-use ribs 26B are disposed at equidistant intervals on, so as to project from, the upper surface of the annular extension portion 26A, and plural (e.g., three) welding-use ribs 24B (see FIG. 5) that are equal to the ribs 26B are disposed at equidistant intervals on, so as to project from, the undersurface of the annular extension portion 24A.

Thus, the undersurface of the annular extension portion 24A is ultrasonically welded to the upper surface of the protruding portion 22A, and the upper surface of the annular extension portion 26A is ultrasonically welded to the undersurface of the protruding portion 22A. That is, the height of each of the annular extension portion 24A and the annular extension portion 26A is equal to about ½ the height of the reel hub 22 excluding a height (thickness) H of the protruding portion 22A, and the reel hub 22 is disposed, so as to be incapable of relative rotation by welding, on the outer peripheral surface side of the annular extension portion 24A and the annular extension portion 26A. It will be noted that the height (thickness) H of the protruding portion 22A is smaller than a thickness W of the reel hub 22.

Further, one or several gates (not shown) serving as injection openings for injecting a resin material when molding the reel hub 22 are disposed in the distal end surface (radial direction inner surface) of the protruding portion 22A. Moreover, a length L that the protruding portion 22A protrudes in the radial direction is equal to a thickness D of the extension portions 24A and 26A (L=D). Thus, the brake member 80 (described later) and a release member 90 (described later) disposed inside the reel hub 22 reliably do not interfere with the protruding portion 22A. Further, in regard to the order in which the flanges 24 and 26 are welded to the protruding portion 22A, it is preferable for the lower flange 26 (the extension portion 26A), which is disposed with a reel gear 44 (described later) and the like for which positional precision with the reel hub 22 is demanded, to be first.

As shown in FIG. 1 to FIG. 3, the reel gear 44 is annularly formed in the undersurface of the lower flange 26, and a gear opening 40 for exposing the reel gear 44 to the outside is disposed in the substantial center of the lower case 16. The reel gear 44 exposed from the gear opening 40 meshes with, and is driven to rotate by, a drive gear 102 (see FIG. 7 and FIG. 8) formed on a rotating shaft 100 of the drive device, whereby the reel 20 becomes relatively rotatable with respect to the case 12 inside the case 12.

Further, an annular reel plate 46 comprising a magnetic material is fixedly attached, by insert molding or the like, to the undersurface of the lower flange 26 on the radial direction inner side of the reel gear 44. The reel plate 46 is configured to be attracted and held by the magnetic force of an annular magnet (not shown) disposed in the rotating shaft 100 of the drive device. Moreover, the reel 20 is held, so as to not rattle, by a guide regulation wall 42 that is partially disposed on, so as to project from, the inner surfaces of the upper case 14 and the lower case 16 and which serves as an inner wall on a circular locus coaxial with the gear opening 40.

Further, as shown in FIG. 4 and FIG. 5, engagement gears 48 are plurally disposed at equidistant intervals (e.g., three at 120° intervals) upright on the lower flange 26 on the radial direction inner side of the annular extension portion 26A and at predetermined positions on a circular locus coaxial with the lower flange 26. Through holes 29 are plurally disposed at equidistant intervals (in this case, three at 120° intervals) in the lower flange 26 between the engagement gears 48 and at predetermined positions on the reel gear 44 when seen in bottom view. Additionally, a discoid brake member 80 molded by a resin material such as polyacetal (POM), for example, is insertingly disposed inside the reel hub 22.

As shown in FIG. 1 to FIG. 3, a brake gear 84 capable of meshing with the engagement gears 48 is annularly formed on the peripheral edge portion of an undersurface 80A of the brake member 80. Additionally, an engagement wall portion 86 including a groove portion 86A that is substantially cross-shaped when seen in plan view and into which is inserted a rotation regulating rib 76 that is substantially cross-shaped when seen in plan view and projects downward from the inner surface of the top plate 14A of the upper case 14 is disposed upright on the upper surface of the brake member 80 so as to be slightly higher than the height of the rotation regulating rib 76. Thus, the brake member 80 is configured to be incapable of rotating with respect to the case 12 (the upper case 14) and is movable up and down while being guided without slanting inside the reel hub 22.

Further, a compression coil spring 98 is disposed between the upper case 14 and the brake member 80. That is, the compression coil spring 98 is disposed in a state where one end thereof contacts the inner side of an annular projection 78 (between the rotation regulating rib 76 and the annular projection 78) disposed on the outer side of the rotation regulating rib 76 so as to project from the upper case 14 and where the other end thereof contacts the inside of an annular groove 88 disposed in the upper surface of the brake member 80. Thus, the position of the compression coil spring 98 does not shift in the radial direction, and the brake member 80 is always biased downward by the biasing force of the compression coil spring 98.

Consequently, when the recording tape cartridge 10 is not in use (when it is not loaded in the drive device), the brake gear 84 always meshes with the engagement gears 48, and the reel 20 is in a rotation lock state where relative rotation of the reel 20 with respect to the case 12 is deterred. At this time, the reel 20 is pushed against the lower case 16 by this biasing force to cause the reel gear 44 to be exposed from the gear opening 40. Further, in order to stop the brake member 80 from rattling (shifting position in the radial direction) inside the reel hub 22, position regulating ribs 28 having a length extending across the entire height of the annular extension portion 26A are plurally disposed at equidistant intervals on the inner peripheral surface of the annular extension portion 26A (see FIG. 4 and FIG. 5).

Further, a release member 90 that has an equilateral triangle shape when seen in plan view and is molded by a resin material such as polybutylene terephthalate (PBT), for example, is disposed inside the reel hub 22 on the underside of the brake member 80 (between the lower flange 26 and the brake member 80). Through holes 92 having a predetermined shape are plurally disposed (those shown in the drawings comprise three and have a hexagonal shape) at predetermined positions in the release member 90, so that the release member 90 is lightweight.

Further, substantially circular column-shaped leg portions 94 that are inserted through the through holes 29 and project a predetermined height downward from above the rear gear 44 of the lower flange 26 are disposed on, so as to project from, the undersurface of the release member 90 and at the vertex portions thereof. Consequently, the leg portions 94 are pushed up so that the brake member 80 is pushed up via the release member 90 in accompaniment with the drive gear 102 of the rotating shaft 100 meshing with the reel gear 44.

It will be noted that, at this time, the leg portions 94 do not completely come out of the through holes 29 even when the release member 90 rises to its maximum position (ordinarily about 2 mm to 3 mm). Further, a planar portion 96 that is circular when seen in plan view is formed in the center of the upper surface of the release member 90, and a substantially hemispherical release projection 82 disposed so as to project from the center of the undersurface 80A of the brake member 80 contacts the planar portion 96 (see FIG. 7 and FIG. 8). Consequently, the area of contact between the brake member 80 and the release member 90 is reduced, and sliding resistance during use (when the reel 20 rotates) is alleviated.

Next, the action of the recording tape cartridge 10 and the reel 20 of the above-described configuration will be described. When the recording tape cartridge 10 of the above-described configuration is not in use (during storage or transport), the opening 18 is closed by the door 50. Additionally, the recording tape T is wound onto the outer peripheral surface of the reel hub 22 of the reel 20.

Here, the protruding portion 22A that is rectangular when seen in cross-sectional view is annularly disposed on the inner peripheral surface of the reel hub 22 in the substantial center of the inner peripheral surface of the reel hub 22 in its height direction so as to protrude a predetermined length L in the radial direction of the reel 20 (the reel hub 22). Additionally, the height (thickness) H of the protruding portion 22A is smaller than the thickness W of the reel hub 22. Further, one or several gates (not shown) serving as injection openings for injecting the resin material when molding the reel 22 are disposed in the distal end surface (radial direction inner surface) of the protruding portion 22A.

Consequently, when the reel hub 22 is molded, the resin material injected from the gate(s) flows excellently from the protruding portion 22A to the upper end portion and the lower end portion of the reel hub 22. Thus, it can be ensured that contraction and deformation resulting from the cooling times of the resin material being different does not occur even in the reel hub 22 on which the protruding portion 22A is formed. That is, even the reel hub 22 on which the protruding portion 22A is formed can be accurately molded.

Further, when the reel 20 is to be assembled, first the extension portion 26A of the lower flange 26 is welded to the protruding portion 22A, and then the extension portion 24A of the upper flange 24 is welded to the protruding portion 22A. Consequently, centering of the reel gear 44 with respect to the reel hub 22 (positioning that causes their rotational centers to coincide) can be accurately performed. Further, because the extension portions 24A and 26A disposed upright on the upper flange 24 and the lower flange 26 are welded to the protruding portion 22A of the reel hub 22, welding of the upper flange 24 and the lower flange 26 with respect to the reel hub 22 is easy and the welding strength thereof can be improved.

Moreover, because the reel hub 22 is disposed on the outer peripheral surface side of the extension portions 24A and 26A and the protruding portion 22A is annularly disposed on, so to project from, the inner peripheral surface side of the reel hub 22, the rigidity of the reel hub 22 can be improved. Consequently, collapsing deformation of the reel hub 22 inward in the radial direction can be prevented even when the winding amount of the recording tape T is increased and the winding constricting force increases. Further, because the protruding length L of the protruding portion 22A is equal to the thickness D of the extension portions 24A and 26A (L=D), there is no potential for the brake member 80 and the release member 90 to interfere with the protruding portion 22A.

When the recording tape T to be used, the recording tape cartridge 10 is loaded from front wall 12A into the drive device along the direction of arrow A. Then, first the opening/closing member disposed in the drive device engages with the convex portion 56 of the door 50. Then, when the recording tape cartridge 10 moves further in the direction of arrow A in this state, the opening/closing member causes the convex portion 56 to move relatively rearward counter to the biasing force of the coil spring 58. Then, the door 50 from which the convex portion 56 projects slides rearward inside the groove portions 64 along the right wall 12B to open the opening 18.

In this manner, when the recording tape cartridge 10 is loaded a predetermined depth into the drive device and the opening 18 is completely opened, a positioning member (not shown) of the drive device is relatively inserted into a positioning hole portion (not shown) formed in the lower case 16. Here, use of the term "relatively" means that there are instances where the recording tape cartridge 10 is lowered and instances where the positioning member rises, so the same is true of instances where "relatively" is used below. Thus, the recording tape cartridge 10 is accurately positioned in a predetermined position inside the drive device, and further sliding of the door 50 (movement rearward) is regulated.

Further, when the recording tape cartridge 10 is positioned in the predetermined position, the rotating shaft 100 relatively enters the gear opening 40 to cause the drive gear 102 to mesh with the reel gear 44. Then, in accompaniment with the drive gear 102 meshing with the reel gear 44, the leg portions 94 projecting on the reel gear 44 are pushed up counter to the biasing force of the compression coil spring 98, the brake member 80 is pushed upward via the release member 90, and the meshing between the brake member 84 and the engagement gears 48 is released.

Then, in a state where the drive gear 102 and the reel gear 44 are completely meshed, the reel plate 46 is attracted and held by the magnetic force of the annular magnet (not shown) disposed inside the drive gear 102, whereby the reel 20 is placed in a lock release state where it is relatively rotatable with respect to the case 12 inside the case 12 while the meshing of the reel gear 44 with respect to the drive gear 102 is maintained (see FIG. 8).

Meanwhile, the pullout member disposed in the drive device enters the case 12 through the opened opening 18 and grips and pulls out the leader pin 30 positioned and held in the pin holding portions 36. At this time, because the recording tape cartridge 10 is accurately positioned inside the drive device, the pullout member can reliably cause its hooks to lock into the annular grooves 32 in the leader pin 30. Further, because the rotation lock state of the reel 20 is released, the reel 20 can rotate in accompaniment with the pulling out of the leader pin 30.

In this manner, the leader pin 30 that has been pulled out from the opening 18 is housed in an unillustrated take-up reel. Then, the take-up reel and the reel 20 are driven to rotate synchronously, whereby the recording tape T is sequentially pulled out from the case 12 while being taken up on the take-up reel, and the recording and playback of information is performed by a recording and playback head (not shown) disposed along a predetermined tape path.

When the recording and playback of information ends and the recording tape cartridge 10 is to be ejected from the drive device, first, the rotating shaft 100 reversely rotates, whereby the recording tape T is rewound onto the reel 20. Then, when the recording tape T is completely rewound onto the reel 20 and the leader pin 30 is held in the pin holding portions 36, the positioning member is relatively removed from the positioning hole portion, the rotating shaft 100 is relatively removed from the gear opening 40, and the meshing of the drive gear 102 with respect to the reel gear 44 is released.

Then, the brake member 80 and the release member 90 are pushed downward by the biasing force of the compression coil spring 98, the leg portions 94 inserted through the through holes 29 project a predetermined height downward from the undersurface of the lower flange 26 on the reel gear 44, and the brake gear 84 meshes with the engagement gears 48. Thus, the reel 20 is again placed in the rotation lock state where relative rotation inside the case 12 is deterred (see FIG. 7).

Thereafter, the recording tape cartridge 10 is moved in the opposite direction of the direction of arrow A by an unillustrated ejecting mechanism. Then, in accompaniment with this movement, the door 50 is slid by the biasing force of the coil spring 58 in the direction in which it closes the opening 18 to completely close the opening 18 (returns to its initial state). In this manner, relative rotation of the reel 20 with respect to the case 12 is locked, and the recording tape cartridge 10 whose opening 18 has been closed is completely ejected from the inside of the drive device.

As described above, the annular protruding portion 22A is formed on the inner peripheral surface of the reel hub 22, and the annular extension portion 26A of the lower flange 26 and the annular extension portion 24A of the upper flange 24 are welded in this order to the annular extension portion 22A, so that centering of the reel gear 44 with respect to the reel hub 22 can be done accurately, the welding strength can be raised, and the rigidity of the reel hub 22 can be raised. Consequently, collapsing deformation of the reel hub 22 can be prevented even when the winding amount of the recording tape T increases. That is, a recording tape cartridge 10 capable of sufficiently accommodating an increase in recording capacity can be obtained. Further, because the recording tape cartridge 10 excellently controls deformation of the reel hub 22, it becomes possible to reduce damage to the recording tape T during long-term storage.

It will be noted that although it is preferable for the protruding portion 22A to project right in the middle of reel hub 22 in its height direction (vertical direction), it is alright if the protruding portion 22A is shifted somewhat in the vertical direction. Consequently, in the preceding exemplary embodiment, the position of the protruding portion 22A is in the substantial center in the height direction. Further, in accompaniment with this, the heights of the extension portions 24A and 26A may also be appropriately adjusted a little. Further, in the preceding exemplary embodiment, the recording tape cartridge 10 has a configuration including the leader pin 30 as the leader member, but the recording tape cartridge 10 may also have a configuration including a leader block (not shown) or leader tape (not shown) as the leader member, and the door 50 that opens and closes the opening 18 may be configured to move along a predetermined circular arc (not shown).

Further, in the preceding exemplary embodiment, the recording tape cartridge 10 where the reel 20 was singly housed was described, but the invention is also applicable to a recording tape cassette (not shown) where two of the reels 20 are housed. Moreover, it suffices as long as the recording tape T is understood to be an elongate, tape-like information recording and playback medium capable of recording information and playing back recorded information. It goes without saying that the recording tape cartridge 10 (the reel 20) is applicable to recording tape T of all recording and playback formats.

What is claimed is:

1. A reel comprising:
   a cylinder-shaped hub having a substantially circular cross-section that includes an inner peripheral surface on which a protruding portion that protrudes in a radial direction is formed and an outer peripheral surface around which recording tape is wound;
   a first flange that is disposed on one end portion of the hub and includes a first extension portion that is welded to the protruding portion; and
   a second flange that is disposed on the other end portion of the hub and includes a second extension portion that is welded to the protruding portion;
   wherein an inner peripheral surface of the reel includes an inner surface of the protruding portion and inner surfaces of the first and second extension portions.

2. The reel of claim 1, wherein the protruding portion is annularly formed.

3. The reel of claim 1, wherein the protruding portion is formed in the substantial center of the hub in an axial direction of the hub.

4. The reel of claim 1, wherein a protruding length of the protruding portion is equal to the thickness of the first extension portion and the second extension portion.

5. The reel of claim 1, wherein the protruding portion has a substantially rectangular radial direction cross section.

6. The reel of claim 1, wherein each of the first and second extension portions has a cylinder shape having a substantially circular cross-section.

7. A method of manufacturing a reel for winding recording tape, the method comprising:
   providing a hub that has a cylinder shape having a substantially circular cross-section and includes an inner peripheral surface on which a protruding portion that protrudes in a radial direction is formed;
   providing a first flange that has a discoid shape and on which an extension portion that projects from one plate surface thereof is formed;
   inserting the extension portion of the first flange into the inside of the hub from one end portion of the hub;
   welding the extension portion of the first flange and the protruding portion together to thereby fix the first flange to the one end portion of the hub;
   providing a second flange that has a discoid shape and on which an extension portion that projects from one plate surface thereof is formed;
   inserting the extension portion of the second flange into the inside of the hub from the other end portion of the hub; and
   welding the extension portion of the second flange and the protruding portion together to thereby fix the second flange to the other end portion of the hub;
   wherein an inner peripheral surface of the reel has an inner surface of the protruding portion and inner surfaces of the first and second extension portions.

8. The reel manufacturing method of claim 7, wherein the protruding portion is annularly formed.

9. The reel manufacturing method of claim 7, wherein the protruding portion is formed in the substantial center of the hub in an axial direction of the hub.

10. The reel manufacturing method of claim 7, wherein a protruding length of the protruding portion is equal to the thickness of the first extension portion and the second extension portion.

11. The reel manufacturing method of claim 7, wherein the protruding portion has a substantially rectangular radial direction cross section.

12. The reel manufacturing method of claim 7, wherein each of the first and second extension portions has a cylinder shape having a substantially circular cross-section.

* * * * *